July 21, 1931.  C. FLOYD  1,815,766
CAN FILLING MACHINE
Filed June 18, 1930    3 Sheets-Sheet 2

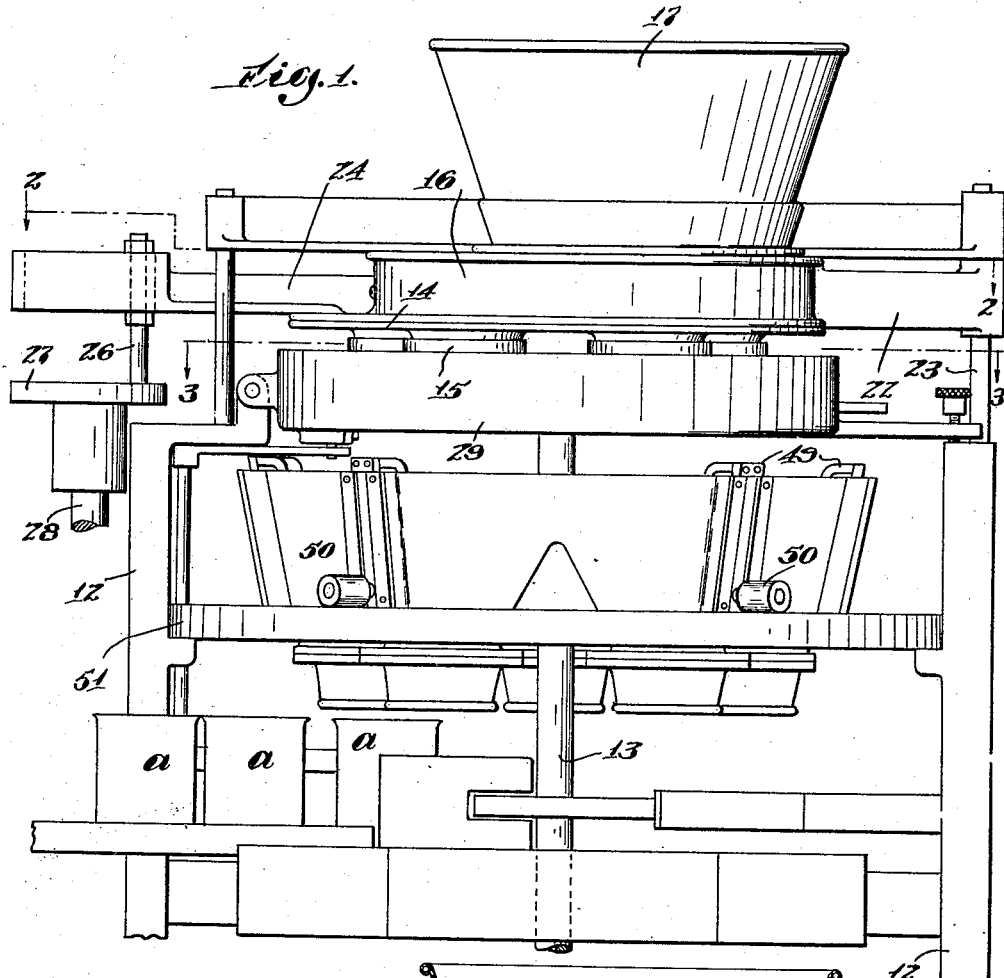

Inventor
Carol Floyd
by A. W. Harrison
Attorney

July 21, 1931.  C. FLOYD  1,815,766
CAN FILLING MACHINE
Filed June 18, 1930  3 Sheets-Sheet 3

Inventor
Carol Floyd
by O. W. Harrison
Attorney

Patented July 21, 1931

1,815,766

UNITED STATES PATENT OFFICE

CAROL FLOYD, OF ORLANDO, FLORIDA, ASSIGNOR TO DR. P. PHILLIPS COMPANY, OF ORLANDO, FLORIDA, A CORPORATION OF FLORIDA

CAN FILLING MACHINE

Application filed June 18, 1930. Serial No. 461,900.

This invention relates to the canning of substances, especially fruit such as oranges and grape fruit, and has particular reference to improvements in a well known type of can-filling machinery which automatically brings empty cans successively to position to receive the fruit from one of a series of ring-shaped measuring chambers, which latter receive the fruit from a supply hopper, said machine also having receiving funnels below the measuring chambers, with plungers which automatically press the fruit into the cans.

One of the objects of the present invention is to provide such a machine with means for preventing crushing injury to any pieces of fruit which may project above the tops of the measuring rings. This object is attained by means of a knife which cuts off such projecting fruit.

Another object is to provide means for preventing fruit from escaping from a measuring ring if no can is in position to receive it.

Another object is to provide means for permitting a certain limited quantity of juice to be deposited in each can prior to the can being filled with the fruit itself.

With the above mentioned objects in view, the invention consists in the construction and combination of parts substantially as hereinafter described and claimed.

Of the accompanying drawings:—

Figure 1 is a side elevation of the machine, omitting such details as are unnecessary to an understanding of the invention.

Figure 4 represents a section on the curved line 4—4 of Figure 2, on a larger scale than that figure.

Similar reference characters indicate similar parts or features in all of the figures.

Portions of a suitable frame for the machine are illustrated at 12, and a power-driven shaft 13 is mounted to rotate therein. Secured to the upper end of the shaft are the upper and lower measuring members 14, 15, which, as usual in the type of machine hereinbefore referred to, are relatively adjustable to effect the desired capacity thereof. Above said measuring members is the shaker 16, and above the latter is the supply hopper 17. The chambers within the members 14, 15, are indicated at 18. As so far described, the structure is practically the same as that of a well known can filling machine and the details thereof, therefore, need no further description or illustration.

One of my improvements will now be described.

Figure 2:
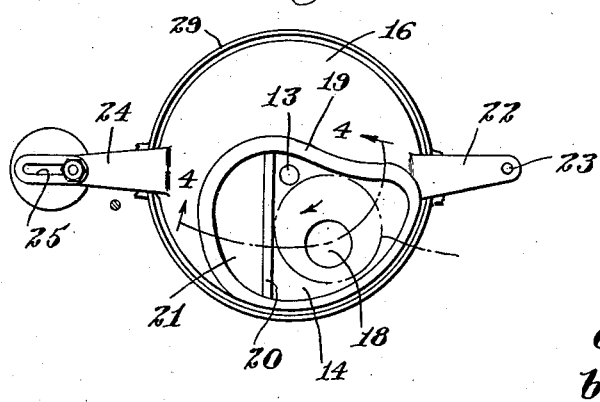
Figure 2 represents a section on line 2—2 of Figure 1, on a much smaller scale.

In the shaker 16 is an opening 19, the preferred shape of which is illustrated in the reduced-size Figure 2, and traversing said opening is a bar having a knife edge 20 behind which is an upwardly inclined surface of a block or member 21 (Fig. 4) which, for convenience of description, may be referred to as a mold board. The shaker 16 is operated in the usual well known manner, said shaker having an arm 22 (Figs. 1 and 2) fitting a pin 23 supported by the frame, and having an oppositely projecting arm 24 provided with a slot 25 engaging a pin 26 eccentrically projecting from a disk 27 at the upper of the shaft 28. As the shaker swings or oscillates, due to the rotation of the pin 26 in the slot of the arm 24, the knife 20 acts to effect a shearing cut in any such plugs of fruit as may be projecting above the tops of the measuring rings 18 as such rings move in the direction of the arrow adjacent to Figure 2. Then any such surplus fruit is shoved up onto the mold board 21 in much the same way as a plow in a field causes earth to be shoved up onto its mold board. In the present machine such surplus fruit will later find its way around to pass into another, following, measuring ring. Such shearing cut of projecting plugs of fruit prevents injury to the fruit by tearing or crushing it.

Figure 5:
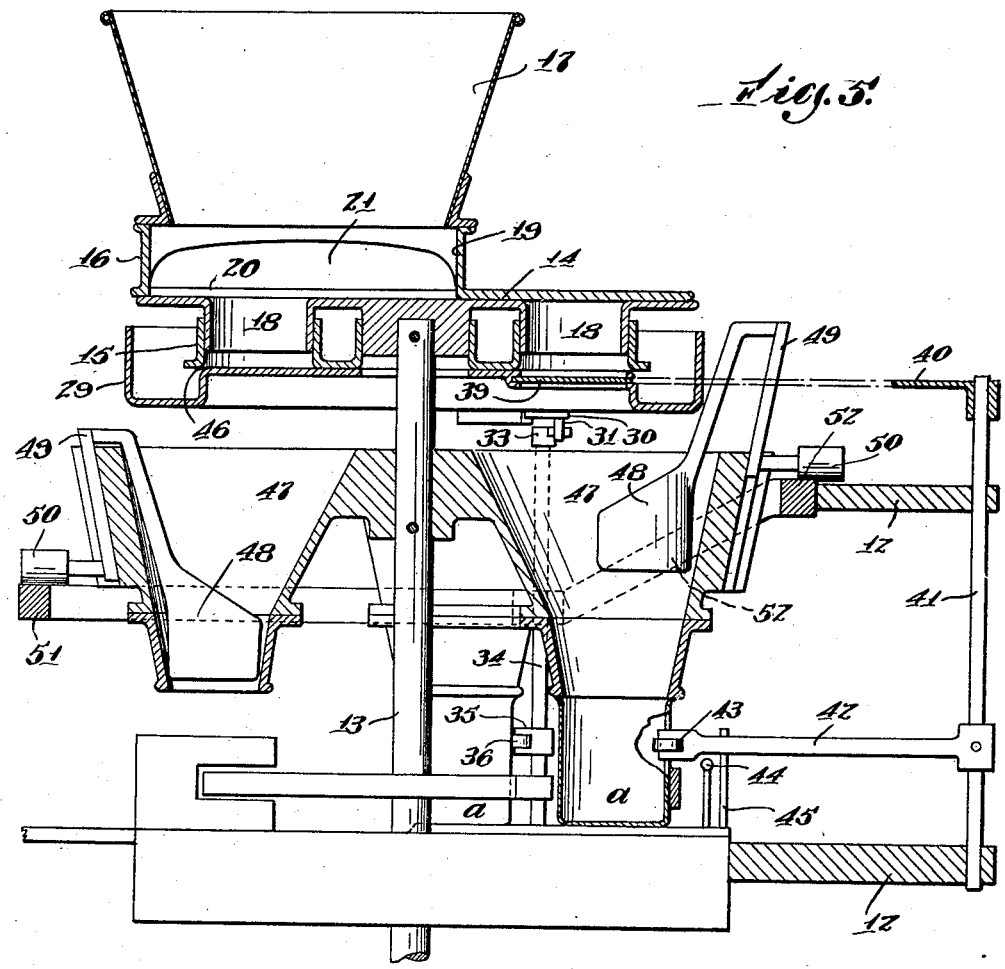
Figure 5 represents a section on the somewhat irregular line 5—5 of Figure 3.
Figure 7:
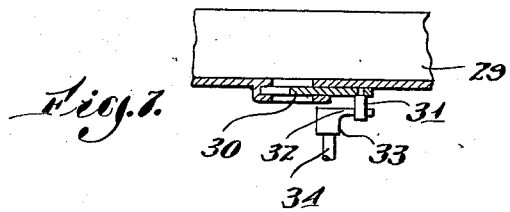
Figure 7 represents a detail section on line 7—7 of Figure 3.

Suitably mounted in fixed position below the ring chambers 18 is a juice receiver for the usual purpose, but said receiver in the present machine has a marginal portion lower than the central portion to provide an annular trough or receiver 29 (Figs. 1, 2 and 5). At one point, the bottom of said receiver has an opening controlled by a slide valve plate 30 (Figs. 3 and 7) having a pin 31 engaged by the forked end 32 of an arm 33 of a vertically mounted rocking shaft or pin 34. Said shaft has, at its lower end, an arm 35 (Figs. 3 and 5) provided with a roll 36. A spring 37 normally holds the arm 35 against a stop pin 38 and maintains the valve closed. When a can *a* however, on its way to be filled, reaches the roll 36, it effects the actuation of the vertical shaft 34 and opens the valve 30 briefly to permit a limited quantity of juice to escape from the annular receiver into the can that effected the opening of the valve. If no can is moving along so as to contact with the roll 36, the valve will not open and so no juice will be wasted.

Figure 3:
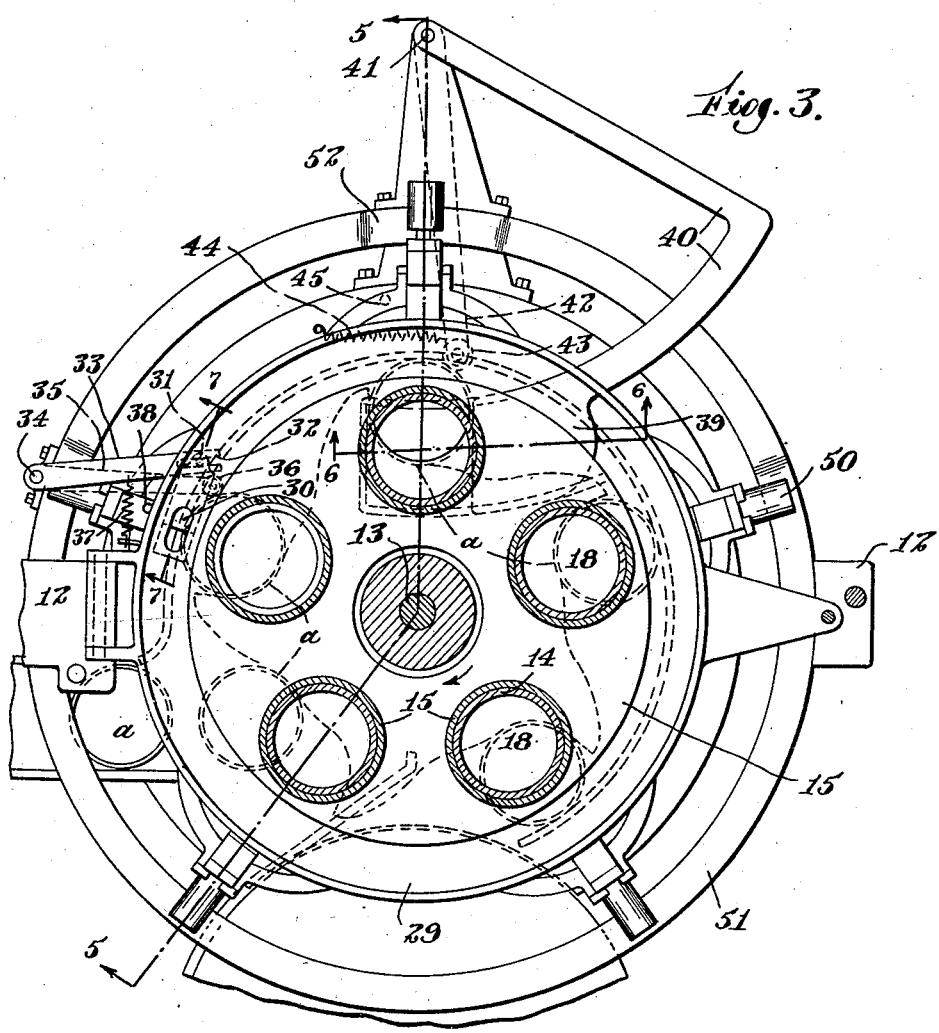
Figure 3 represents a section on line 3—3 of Figure 1.
Figure 6:
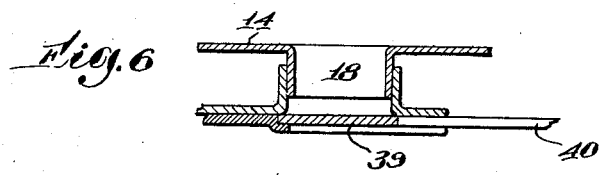
Figure 6 represents a detail section on line 6—6 of Figure 3.

After a can passes the position just described, it reaches a position to be filled with fruit, and I have provided means somewhat similar to what has just been described, to control the supply of fruit to a can according to the arrival of a can in position to be filled, or its absence therefrom. As illustrated by Figures 3, 5 and 6, a valve 39 is mounted in guideways in the raised portion of the juice receiver, which raised portion provides the bottom of the measuring rings 18. Said valve is carried by an arm 40 of a vertical rocking shaft 41 mounted in bearings in the frame 12 and having a lower arm 42 provided with a roll 43. A spring 44 tends to hold the arm 42 against a stop pin 45 to maintain the slide valve 39 closed; but when a can *a* contacts with said roll 43 it effects the opening of said valve as will be readily understood. This effects the saving of a can-filling quantity of fruit if at any time the machine fails to carry a can to position to be filled.

To permit the draining of juice from the measuring chambers 18 into the annular receiver 29, a slight crevice 46 (Fig. 5) is provided between each ring and said receiver.

The funnels 47 through which the fruit passes from the measuring rings to the cans are, as in the well known machine referred to, connected to be rotated by the shaft 13, and the rest of the structure which will now be briefly described, also forms no part of my invention. Movable in each funnel 47 is a plunger 48 having an arm 49 extending over and guided in the outer wall of the series of funnels, the end of said arm having a roll 50 riding on the track 51 which has a raised or cam portion 52 which, as the funnels revolve, causes the plungers to be successively lifted to the proper position to permit the charges of fruit to pass down into the cans, after which the plungers successively descend and press the fruit into the cans.

The drainage crevices 46 cooperate with the two valves 30, 39, in enabling just the desired amount of juice to be supplied to each can relatively to the fruit. This is because the drainage of the juice from the measuring rings 18 not only supplies the annular receiver with juice which is then measured out by the valve 30 into each can, but also leaves in each ring 18 so little juice that the said rings 18 contain only what may be termed drained fruit of a given weight that is then permitted by the valve 39 to pass to and be pressed into each can in addition to the previously deposited predetermined quantity of juice.

Having now described my invention, I claim:—

1. In a can filling machine, a rotary series of measuring chambers, a shaker above the chambers, said shaker having an opening, and a knife traversing said opening.

2. In a can filling machine, a rotary series of measuring chambers, a shaker above the chambers, said shaker having an opening, a knife traversing said opening, and means having an upwardly inclined surface to gather material removed by the knife.

3. In a can filling machine, a horizontal rotary series of measuring chambers, a horizontal annular receiver in position to receive juice drained from said chambers, a valve for controlling passage of juice from said receiver to a can, another valve for controlling the escape of material from each chamber which reaches a position to be emptied, and means for operating said valves by the arrival of a can in successive positions to receive juice and material.

4. In a can filling machine, a rotary series of measuring chambers, a stationary juice receiver below said chambers and having its entire marginal portion lower than the central portion, said lower marginal portion providing an annular trough, crevices being provided to permit the passage of juice from the said chambers into the said annular trough.

5. In a can filling machine, a rotary series of measuring chambers, a stationary juice receiver below said chambers and having its entire marginal portion lower than the central portion, said lower marginal portion providing an annular trough, crevices being provided to permit the passage of juice from the said chambers into the said annular trough, the said annular trough having a valve-controlled opening, and means for operating said valve to open it when a can is in position to receive juice.

In testimony whereof I have affixed my signature.

CAROL FLOYD.